(12) United States Patent
Bouazizi

(10) Patent No.: US 8,346,945 B2
(45) Date of Patent: Jan. 1, 2013

(54) DYNAMIC SDP UPDATE IN IPDC OVER DVB-H

(75) Inventor: Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 630 days.

(21) Appl. No.: 11/854,483

(22) Filed: Sep. 12, 2007

(65) Prior Publication Data

US 2008/0168178 A1 Jul. 10, 2008

Related U.S. Application Data

(60) Provisional application No. 60/844,525, filed on Sep. 14, 2006.

(51) Int. Cl.
*G06F 15/16* (2006.01)
(52) U.S. Cl. .................. 709/228; 709/231; 709/248
(58) Field of Classification Search .................. 709/228, 709/248
See application file for complete search history.

(56) References Cited

U.S. PATENT DOCUMENTS

| | | | |
|---|---|---|---|
| 2002/0141740 A1* | 10/2002 | Matsui .................. | 386/111 |
| 2004/0125757 A1* | 7/2004 | Mela et al. ............ | 370/261 |
| 2005/0090235 A1 | 4/2005 | Vermola et al. | |
| 2005/0216472 A1* | 9/2005 | Leon et al. ............ | 707/10 |
| 2005/0254526 A1* | 11/2005 | Wang et al. ........... | 370/503 |
| 2006/0053450 A1* | 3/2006 | Saarikivi et al. ...... | 725/46 |
| 2007/0071216 A1 | 3/2007 | Shen et al. | |
| 2007/0237185 A1* | 10/2007 | Pereira et al. ......... | 370/503 |

FOREIGN PATENT DOCUMENTS

| | | |
|---|---|---|
| EP | 1024661 | 8/2000 |
| GB | 2406754 | 4/2005 |
| WO | WO 2007/029091 | 3/2007 |

OTHER PUBLICATIONS

International Search Report for PCT Application No. PCT/IB2007/053702.
English Translation of Office Action for corresponding Korean Application No. 2009-7007556 dated Dec. 20, 2010.
English Translation of Office Action for corresponding Russian Application No. 2009111339 dated Dec. 10, 2010.
Office Action from Chinese Patent Application No. 200780039870.8, dated Apr. 8, 2011.
English translation of Office Action from Chinese Patent Application No. 200780039870.8, dated Apr. 8, 2011.
Office Action for Russian Patent Application No. 2009111339/09(015409), dated Dec. 10, 2010.
English translation of Office Action for Russian Patent Application No. 2009111339/09(015409), dated Dec. 10, 2010.
Office Action for Canadian Patent Application No. 2,663,422, dated Jul. 5, 2011.

* cited by examiner

*Primary Examiner* — Luat Phung
*Assistant Examiner* — Justin N Mullen
(74) *Attorney, Agent, or Firm* — Alston & Bird LLP

(57) ABSTRACT

Various embodiments of present invention relate to the synchronization of an SDP stream to the media stream. In various embodiments, the SDP-consuming application initiates a FLUTE receiver and retrieves new versions of the SDP file. The terminal also retrieves information from the RTCP layer about the current sender time. The sender time is indicated as an NTP timestamp in RTCP sender reports. The receiver indicates to the player that the new SDP file will be valid after some time period. Various embodiments of the present invention also cover the behavior of a terminal upon receiving an SDP update. Still further, various embodiments of the present invention provides for richer out-of-band ESG delivery than conventional systems, permitting more meaningful session updates.

28 Claims, 5 Drawing Sheets

DYNAMIC SDP UPDATE IN IPDC OVER DVB-H

FIELD OF THE INVENTION

The present invention relates generally to the use of Internet Protocol Datacasting (IPDC) services over the Digital Video Broadcasting-Handheld (DVB-H) specification. More particularly, the present invention relates to the synchronization and use of Session Description Protocol (SDP) updates when a terminal is using a stream service in accordance with IPDC over DVB-H

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

IPDC is a broadcast technology which enables cost effective and efficient distribution of digital content to mass audiences. Technically, IPDC makes use of the DVB-T networks to broadcast any IP based data. IPDC over the DVB-H specification defines two different types of delivery methods. These methods comprise file delivery and streaming delivery. The file delivery method is based on the File Delivery over Unidirectional Transport (FLUTE) protocol and allows for the delivery of files as transport objects to the terminal. The FLUTE protocol is discussed in detail at the Internet Engineering Task Force (IETF) website. The file delivery method is used, e.g., for the delivery of the Electronic Service Guide (ESG) data. ESG data announces information about the service and how to obtain access to it at the terminal. Several other services, such as the downloading of music and video clips, may also be realized using the file delivery method.

The streaming delivery method, on the other hand, is used for the realization of streaming services such as Mobile TV and Radio. The streaming delivery method is based on the Real-Time Transport Protocol (RTP) and standard media codecs such as H.264/AVC and MPEG-4 HE AAC. Information on the RTP protocol can be found at the IETF website.

In order for a user to consume an IPDC service, a number steps usually need to be performed. First, the terminal needs to tune in to the ESG bootstrap session, which is located at a well known Internet Protocol (IP) address. The ESG bootstrap session provides information on existing ESG providers and their corresponding ESG sessions. The terminal must then tune to the selected/pre-configured ESG session and retrieve a snapshot of the current ESG data. The user is then offered the opportunity to browse the ESG information and to pick up the service of his or her choice for consumption. The terminal retrieves the respective Acquisition Fragment from the ESG. The Acquisition Fragment contains a description of the different media components of the session, as well as a SDP file that describes how to access the session, the media codecs in use, and other configuration information. Information about the SDP protocol can be found at the IETF website. The terminal then tunes to the IP flows of the service in order to consume the data. The SDP file of the session may be delivered embedded within the Acquisition Fragment, or it may be delivered as a separate item in a FLUTE session. The FLUTE session is described by an embedded SDP file in the Acquisition Fragment.

Some Mobile TV channels may require dynamic and unpredictable modifications to the session configuration. These modifications may be similar to a live TV channel where an additional audio language or a multi-camera view is suddenly made available. In such a situation, terminals in a Mobile TV environment that are consuming the service at the time are typically not aware of the changes, as they are typically not following updates to the ESG. It is possible to deliver updates to the SDP in a FLUTE session that is delivered along with the media streams. However, the new SDP file must still be synchronized to a running session, and there are currently issues as to how the terminal should treat SDP session updates. A dynamic session update, as described herein, refers to the operation by which the SDP file of an ongoing session is replaced by a newer SDP file that is signaled through appropriate mechanisms.

ESG data is typically delivered in a different Elementary Stream, and likely also in a different Transport Stream, than the file delivery and streaming sessions that the ESG data describes. In such a case, a terminal typically updates its ESG database upon tune in, and then switches to the selected stream for service consumption. During service consumption, it is assumed that the terminal is not following updates to the ESG, as this significantly increases the power consumption and may not be possible, for example, in case of different Transport Streams. However, some services, such as a TV channel service, may need to update the ESG in an unpredictable manner. As an example, a new audio language or a subtitling stream may appear suddenly in the TV channel's contents. In another case, a previously scheduled event may be postponed due to various types of delays. In such scenarios, the session description file of the streaming session needs to be updated in order to correctly consume the service. Furthermore, terminals that are consuming the service and are not tuned to the ESG have to be made aware of the changes to the session parameters. The ESG specification (which can be found in "Digital Video Broadcasting (DVB); IP Datacast over DVB-H: Electronic Service Guide (ESG)" ETSI TS 102 471 V1.1.1 (2006-04) at the ETSI website) defines, for the above purpose, an out of band delivery mechanism of the SDP file. A FLUTE session may be used to deliver the most up-to-date SDP file to the terminals that are currently consuming the service or are just tuning in to the service. It is anticipated that the FLUTE session is delivered in the same Elementary Stream as the media streams of the streaming service.

SUMMARY OF THE INVENTION

Various embodiments of present invention relate to the synchronization of an SDP stream to the media stream. In various embodiments, the SDP-consuming application initiates a FLUTE receiver and retrieves new versions of the SDP file. The terminal also retrieves information from the RTCP layer about the current sender time. The sender time is indicated as an NTP timestamp in RTCP sender reports. The terminal indicates to the player that the new SDP file will be valid after some time period.

Various embodiments of the present invention also cover the behavior of a terminal upon receiving an SDP update. In the event that currently-consumed media streams are being discontinued as a result of the SDP update, the media player can perform one of several different tasks to address this issue. The media player also possesses a number of potential options in the event that the new SDP file declares new media lines for the stream. Still further, various embodiments of the present invention may provide for richer out-of-band ESG delivery than conventional systems, permitting more meaningful session updates.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

The present invention relates to the synchronization of an SDP stream to the media stream. The present invention also covers the behavior of a terminal upon receiving an SDP update. Still further, the present invention provides for richer out-of-band ESG delivery than conventional systems, permitting more meaningful session updates.

Figure 1:
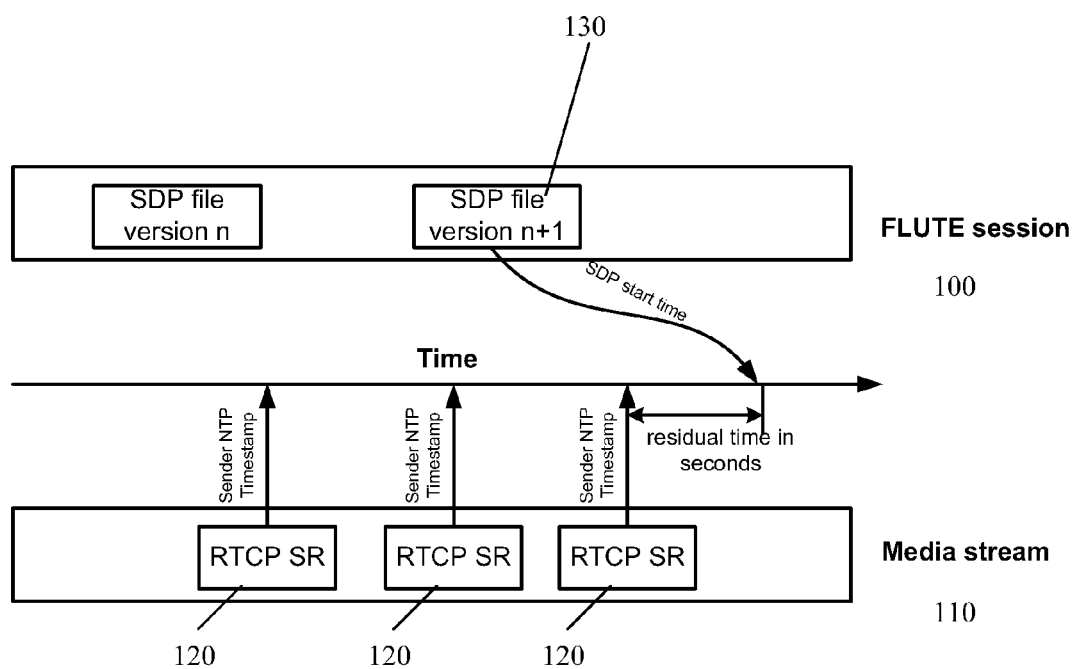
FIG. 1 shows the procedure by which an SDP stream is synchronized with a media stream in accordance with one embodiment of the present invention.

FIG. 1 shows the procedure by which an SDP stream is synchronized with a media stream in accordance with one embodiment of the present invention. Terminals consuming a streaming service with a FLUTE session 100 for dynamic session updates are supposed to download any new version of the SDP file. As described in the Content Delivery Protocol (CDP) specification (which can be found in "Digital Video Broadcasting (DVB); IP Datacast over DVB-H: Content Delivery Protocols, ETSI TS 102 472, V1.1.1 (2006-06)) and in the Electronic Service Guide (ESG) specification (which can be found in Digital Video Broadcasting (DVB); IP Datacast over DVB-H: Electronic Service Guide (ESG), ETSI TS 102 471 V1.1.1 (2006-04)) (both incorporated herein by reference in their entirety)), a new version is identified by a different TOI to Uniform Resource Identifier (URI) mapping that appears in a newer File Delivery Table (FDT) instance. The URI of the SDP file is obtained from the SDPURI element in the acquisition fragment.

Upon the detection of a new version of the SDP file of the streaming service 110, depicted at 130 in FIG. 1, the terminal checks the start time in the SDP "t=" field of the new version 130. The start time is given as a network time protocol (NTP) timestamp (carrying Coordinated Universal Time (UTC), which is independent of time zones and daylight saving time). The terminal then uses the Sender Reports sent in the RTP Control Protocol (RTCP) streams 120 of the streaming service 110 to establish the time synchronization and to schedule the update of the session with the new SDP file.

The terminal may listen to FLUTE session(s) 100 for complete or partial ESG and ESG fragment updates. In addition to or instead of listening, the terminal may, in one embodiment of the invention, receive one or more notifications that inform the terminal of one or more available updates. The terminal may then access all or some of the sessions, enabling the updates to be delivered.

Figure 2:
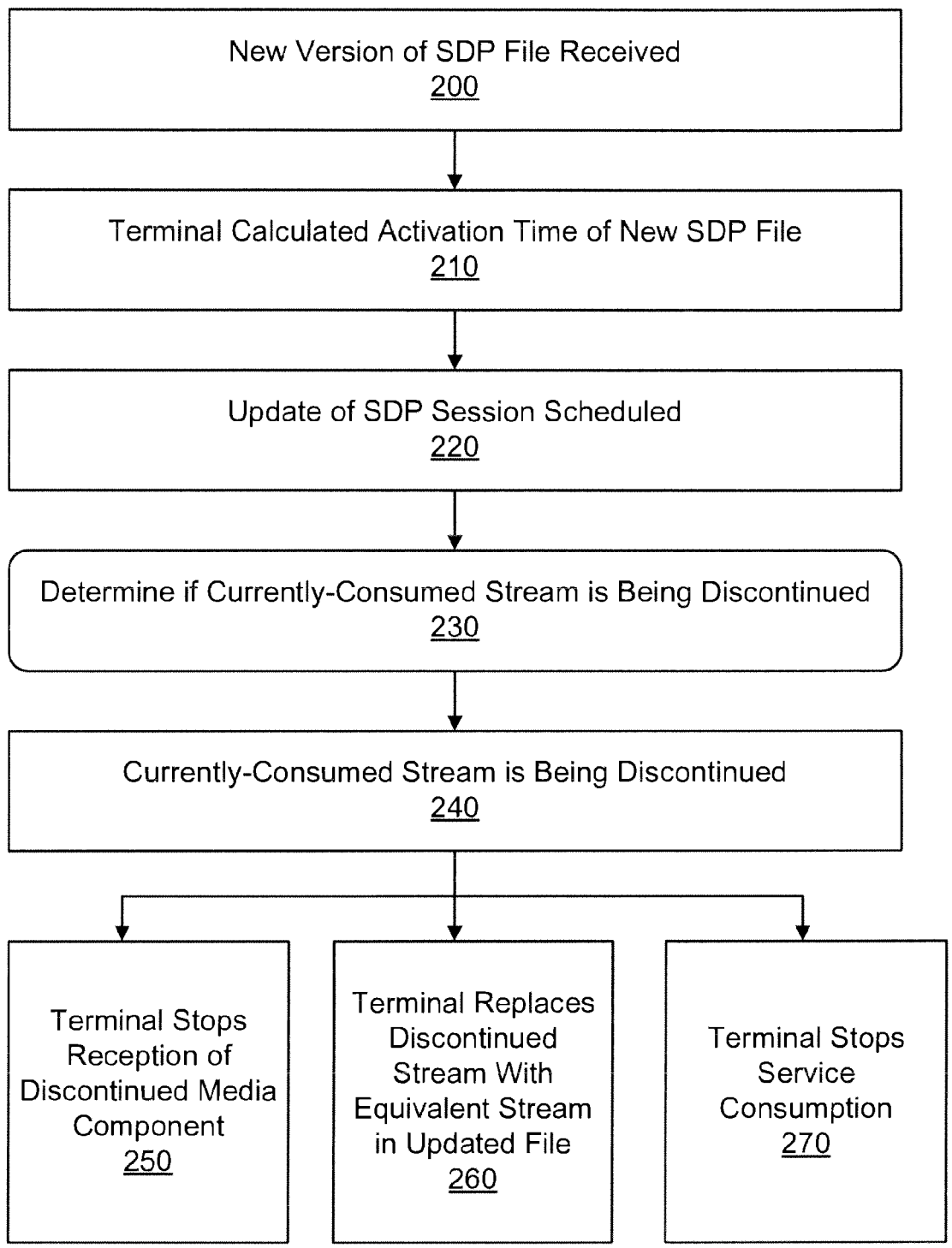
FIG. 2 is a flow chart showing how a media player may respond to a new version of the SDP becoming available in various embodiments of the present invention.

The following is a discussion of how the media player may behave upon receiving a new version of the SDP file according to various embodiments of the present invention. It should be noted that the behavior of the terminal will depend upon the type updates being received. FIG. 2 is a flow chart showing how a media player may respond to a new version of the SDP becoming available in various embodiments of the present invention. At 200, a terminal receives a new version of the SDP file that relates to the streaming service being consumed. At 210, the terminal calculates the activation time of the new SDP file as discussed previously and schedules the update of the session at 220. In one embodiment, the terminal omits any complete tear down and re-initialization of the streaming session. At 230, the terminal analyzes the updated SDP to detect whether any of the currently-consumed media streams are being discontinued. A particular media stream is identified by its destination IP address and port number.

If it is determined that a currently-consumed media stream is being discontinued, represented at 240, the terminal needs to instruct the media player how to continue consumption of the service. Several options for continuing consumption of the service are possible. A first option, represented at 250 is for the terminal to completely stop the reception of the discontinued media component. This is practicable in certain situations, such as when an auxiliary media stream (i.e., a subtitling stream) is discontinued. A second option, represented at 260, involves the terminal replacing the discontinued media stream by an equivalent media stream in the updated SDP file. With this option, an audio stream can replace another audio stream, a video stream can replace a another video stream, a subtitling stream can be replaced with another subtitling stream, etc. The choice of the media stream may be based, for example, on user preferences. For example, if a user has a preferred language for his audio, then the media player could automatically select the user preferred audio stream with that language when it becomes available. The terminal may also prompt the user to select the preferred media streams to be consumed from the session. If only one alternative for audio and video streams is available, then the media player may be instructed to consume the available media stream without further interaction with the user. Another option, represented at 270, is for the terminal to completely stop the service consumption. This option may be chosen, for example, if the session is declared to have ended by the setting of the session end time as being less than or equal to the session start time.

Figure 3:
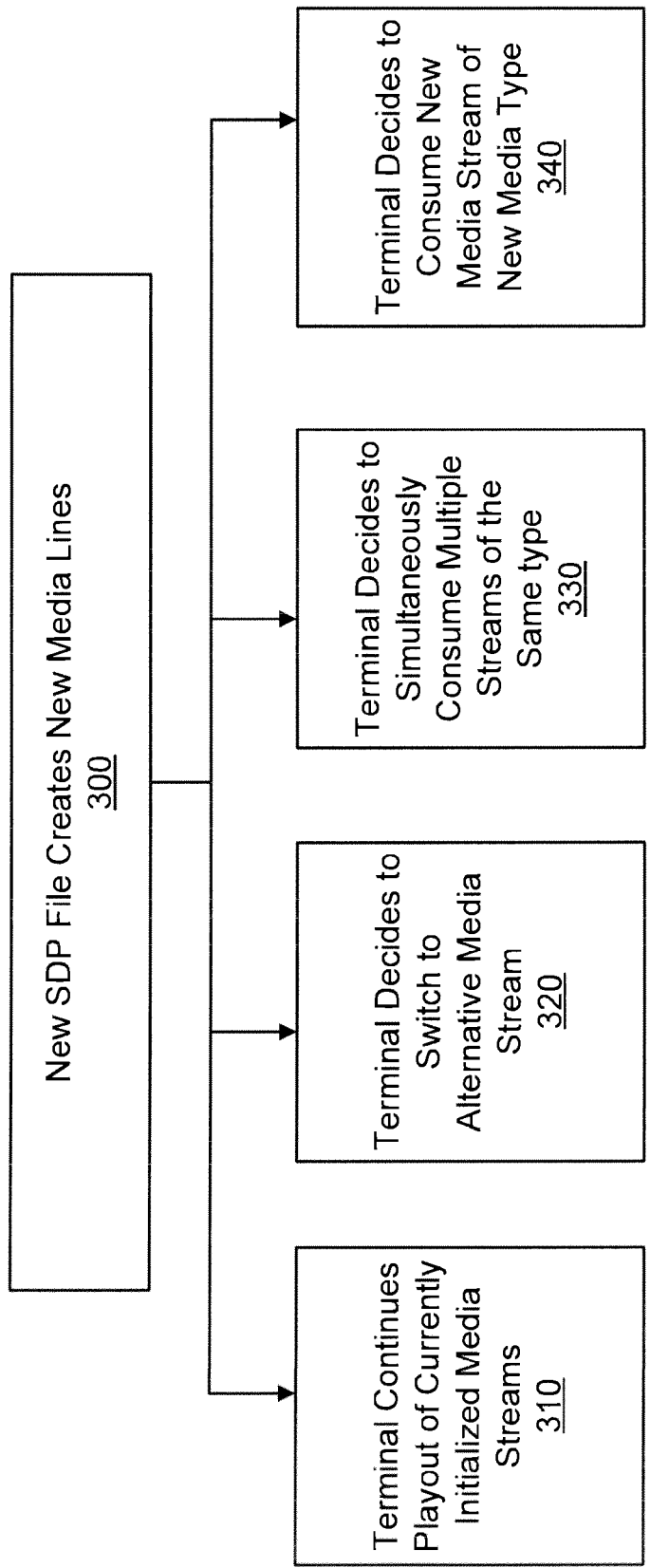
FIG. 3 is a flow chart showing how a media player may respond to a new SDP file creating new media lines according to various embodiments of the present invention.

Another scenario that may arise involves the new SDP file declaring new media lines, possibly in addition to the media lines that are currently being consumed by the terminal. FIG. 3 is a flow chart showing how a media player may respond to a new SDP file creating new media lines. When this occurs, represented at 300, the terminal has several options as to how to behave. For example, the terminal could continue the playout of the currently initialized media streams, which is represented at 310. Alternatively, the terminal could decide, for each media type, whether to switch to an alternative media stream (represented at 320), or possibly to simultaneously consume several media streams of the same type (e.g., in the case of additional audio channels in a new media stream) (represented at 330). This decision may be based on user preferences or on user interactions. Still further, the terminal can decide whether to consume a new media stream of a new media type (e.g. a newly added subtitling stream) based on pre-configured user preferences or user interactions, as represented at 340.

In order to assure a smooth playout, the media player should not interrupt the playout of a media stream before it has buffered the requested amount of data of the new alternative media stream. The media player should perform the switch to the new media stream at a media sample as close as possible to the last media sample played out from the old media stream.

The following is a discussion of how richer out-of-band ESG delivery can be implemented in accordance with the various embodiments of the present invention. A problem with the conventional delivery of the ESG is that terminals are not well informed about the semantics of the changes to the session when they receive an update to the SDP. In such a case, the addition of a new media stream might not be understandable to the terminal. Therefore, additional metadata is needed to inform the terminal about the newly available media components or the discontinued media components. This can be achieved, for example, by delivering various ESG fragments along within the FLUTE session that carries the out-of-band SDP file. One such fragment comprises an Acquisition Fragment, which contains the component descriptions for each of the session components. Another such fragment comprises a Schedule Fragment, which describes the planned start time and end time of the event. Other related fragments, such as the Content Fragment and the Service fragment, may also be delivered over the out-of-band FLUTE session.

When richer out-of-band ESG is at issue, the ESG provider indicates the updated ESG fragments to the network and encapsulates them in an ESG container. The ESG provider also includes an indexing fragment to describe the contents of the ESG container. The FLUTE session then delivers the ESG containers with the same URIs as the ones used in the main ESG session to the terminals at issue.

Figure 4:
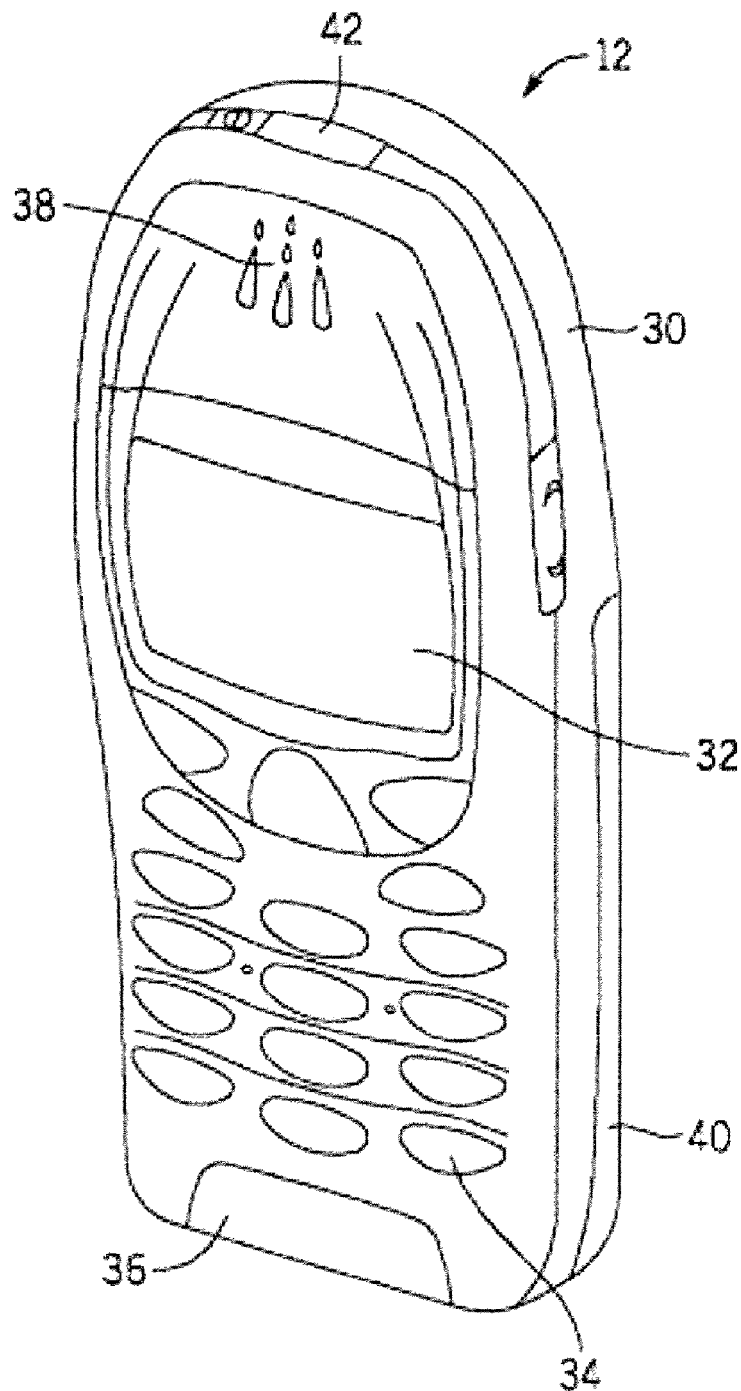
FIG. 4 is a perspective view of a terminal that can be used in the implementation of the present invention.
Figure 5:
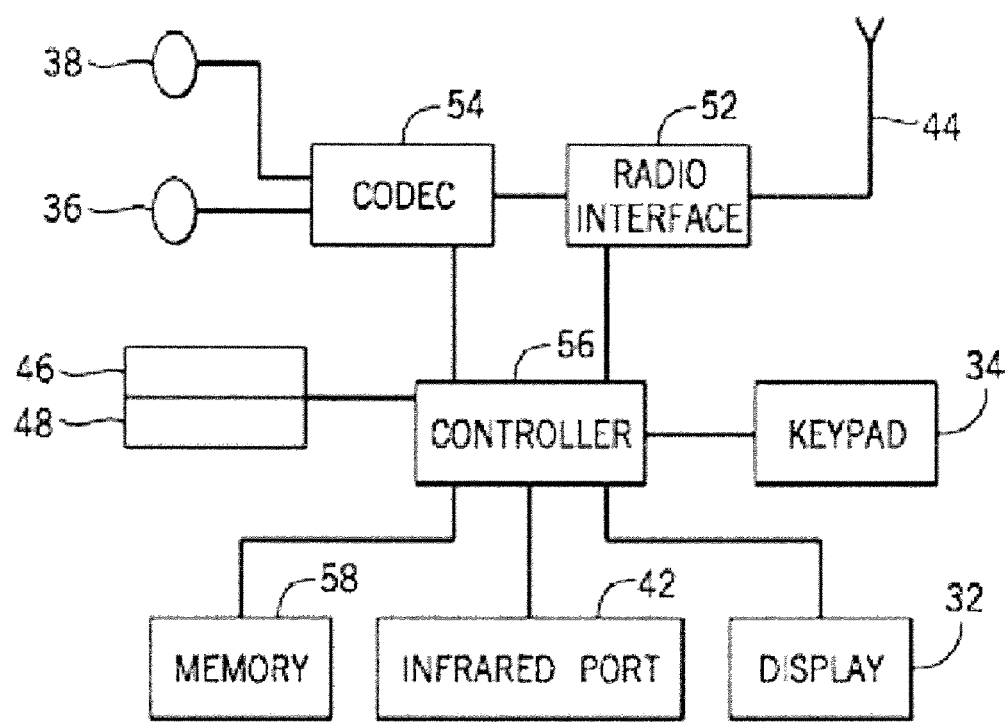
FIG. 5 is a schematic representation of the circuitry of the terminal of FIG. 4.

FIGS. 4 and 5 show one representative terminal within which the present invention may be implemented. It should be understood, however, that the present invention is not intended to be limited to one particular type of terminal. The terminal of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
receiving at least one Electronic Service Guide (ESG) fragment that includes a new version of an SDP file of a streaming service via a FLUTE session, the at least one ESG fragment including information about the new version of the SDP file;
determining whether any currently consumed media stream is affected by the new version of an SDP file;
if the streaming session is potentially affected by the new version of the SDP file, determining a start time for the new version of the SDP file, based on a network protocol timestamp;
using at least one sender report sent in RTP Control Protocol (RTCP) streams of the stream service to synchronize the start time for the new version of the SDP file; and
scheduling a session update with the new version of the SDP file in accordance with the synchronized time.

2. The method of claim 1, wherein the start time for the new version is indicated in a SDP "t=" field of the new version of the SDP file.

3. The method of claim 1 further comprising:
if the streaming session is potentially affected by the new version of the SDP file, implementing an action to address the new version of the SDP file.

4. The method of claim 3, wherein a currently consumed media stream is to be discontinued in light of the new version of the SDP file, and wherein the action comprises termination reception of the media stream at issue.

5. The method of claim 3, wherein a currently consumed media stream is to be discontinued in light of the new version of the SDP file, and wherein the action comprises replacing the media stream at issue with an equivalent stream in the updated SDP file.

6. The method of claim 3, wherein a currently consumed media stream is to be discontinued in light of the new version of the SDP file, and wherein the action comprises terminating service consumption.

7. The method of claim 3, wherein the new version of the SDP file creates new media lines, and wherein the action comprises continuing the playout of currently initialized media streams.

8. The method of claim 3, wherein the new version of the SDP file creates new media lines, and wherein the action comprises replacing at least one media stream with an alternative media stream.

9. The method of claim 3, wherein the new version of the SDP file creates new media lines, and wherein the action comprises consuming multiple streams of the same media type.

10. The method of claim 3, wherein the new version of the SDP file creates new media lines, and wherein the action comprises consuming a new media stream of a new media type.

11. The method of claim 1, wherein the at least one ESG fragment includes component descriptions for individual session components of the new version of the SDP file.

12. The method of claim 1, wherein the at least one ESG fragment includes planned start and end times for an event.

13. A computer program product, embodied in a non-transitory computer readable medium, comprising:
computer code for receiving at least one Electronic Service Guide (ESG) fragment that includes a new version of an SDP file of a streaming service via a FLUTE session, the at least one ESG fragment including information about the new version of the SDP file;
computer code for determining whether any currently consumed media stream is affected by the new version of an SDP file;
computer code for determining a start time for the new version of the SDP file based on a network protocol timestamp, if the streaming session is potentially affected by the new version of the SDP file;
computer code for using at least one sender report sent in RTP Control Protocol (RTCP) streams of the stream service to synchronize the start time for the new version of the SDP file; and
computer code for scheduling a session update with the new version of the SDP file in accordance with the synchronized time.

14. The computer program product of claim 13, further comprising:
computer code for, if the streaming session is potentially affected by the new version of the SDP file, implementing an action to address the new version of the SDP file.

15. An apparatus, comprising:
a processor; and
a memory unit communicatively connected to the processor and including:
computer code for receiving at least one Electronic Service Guide (ESG) fragment that includes a new version of an SDP file of a streaming service via a FLUTE session, the at least one ESG fragment including information about the new version of the SDP file;
computer code for determining whether any currently consumed media stream is affected by the new version of an SDP file;
computer code for determining a start time for the new version of the SDP file based on a network protocol timestamp, if the streaming session is potentially affected by the new version of the SDP file;
computer code for using at least one sender report sent in RTP Control Protocol (RTCP) streams of the stream service to synchronize the start time for the new version of the SDP file; and
computer code for scheduling a session update with the new version of the SDP file in accordance with the synchronized time.

16. The apparatus of claim 15, wherein the start time for the new version is indicated in a SDP "t=" field of the new version of the SDP file.

17. The apparatus of claim 15 further comprising
if the streaming session is potentially affected by the new version of the SDP file, implementing an action to address the new version of the SDP file.

18. The apparatus of claim 17, wherein a currently consumed media stream is to be discontinued in light of the new version of the SDP file, and wherein the action comprises termination reception of the media stream at issue.

19. The apparatus of claim 17, wherein a currently consumed media stream is to be discontinued in light of the new version of the SDP file, and wherein the action comprises replacing the media stream at issue with an equivalent stream in the updated SDP file.

20. The apparatus of claim 17, wherein a currently consumed media stream is to be discontinued in light of the new version of the SDP file, and wherein the action comprises terminating service consumption.

21. The apparatus of claim 17, wherein the new version of the SDP file creates new media lines, and wherein the action comprises continuing the playout of currently initialized media streams.

22. The apparatus of claim 17, wherein the new version of the SDP file creates new media lines, and wherein the action comprises replacing at least one media stream with an alternative media stream.

23. The apparatus of claim 17, wherein the new version of the SDP file creates new media lines, and wherein the action comprises consuming multiple streams of the same media type.

24. The apparatus of claim 17, wherein the new version of the SDP file creates new media lines, and wherein the action comprises consuming a new media stream of a new media type.

25. The apparatus of claim 15, wherein the at least one ESG fragment includes component descriptions for individual session components of the new version of the SDP file.

26. The apparatus of claim 15, wherein the at least one ESG fragment includes planned start and end times for an event.

27. A system, comprising:
a sending device configured to transmit a streaming session and a file delivery session; and
a receiving device configured to receive the streaming session and the file delivery session, the receiving device including:
computer code for receiving at least one Electronic Service Guide (ESG) fragment that includes a new version of an SDP file of a streaming service from the sending device via a FLUTE session, the at least one ESG fragment including information about the new version of the SDP file;
computer code for determining whether any currently consumed media stream is affected by the new version of an SDP file;
computer code for determining a start time for the new version of the SDP file based on a network protocol timestamp, if the streaming session is potentially affected by the new version of the SDP file;
computer code for using at least one sender report sent in RTP Control Protocol (RTCP) streams of the stream service to synchronize the start time for the new version of the SDP file; and
computer code for scheduling a session update with the new version of the SDP file in accordance with the synchronized time.

28. The system of claim 27 further comprising, if the streaming session is potentially affected by the new version of the SDP file, implementing an action to address the new version of the SDP file.

* * * * *